Figure 1:
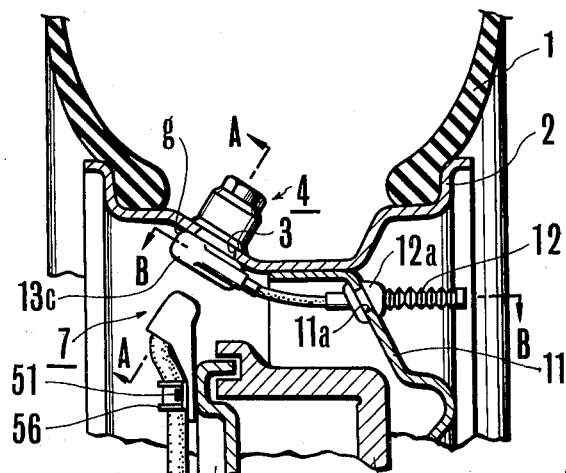

United States Patent [19]
Hata

[11] 3,925,755
[45] Dec. 9, 1975

[54] TIRE PRESSURE ALARM EQUIPMENT
[75] Inventor: Shigeki Hata, Omiya, Japan
[73] Assignee: Kanto Seiki Co., Ltd., Japan
[22] Filed: Mar. 8, 1974
[21] Appl. No.: 449,442

[52] U.S. Cl. ............................... 340/58; 200/61.25
[51] Int. Cl.² ......................................... B60C 23/02
[58] Field of Search ......... 340/58; 200/61.22, 61.25

[56] References Cited
UNITED STATES PATENTS

| | | | |
|---|---|---|---|
| 3,521,230 | 7/1970 | Poole | 340/58 |
| 3,638,180 | 1/1972 | Lejeune | 340/58 |
| 3,781,787 | 12/1973 | Sugiyama | 340/58 |

*Primary Examiner*—Alvin H. Waring
*Attorney, Agent, or Firm*—McGlew and Tuttle

[57] ABSTRACT

The equipment comprises a housing mounted on a wheel rim supporting a tire, and a plunger is mounted in the housing for reciprocation in a direction perpendicular to the radius of the tire, this plunger being movable in accordance with the tire pressure. A shaft is rotatably mounted in the housing, to extend substantially in the radial direction of the tire, the shaft being rotatably supported on ball bearings at each end. The ball bearings serve to restrain the shaft against centrifugal force due to the rotation of the wheel rim and tire. The shaft is normally biased to rotate in one direction by a spring, and has a cut-out notch adjacent one end which is engaged by the plunger so long as the tire pressure is equal to or above a preselected value. A permanent magnet is mounted on the opposite end of the shaft. When the tire pressure drops below the predetermined value, the plunger releases the shaft to rotate through 90°, thus bringing the permanent magnet into a position where it can actively influence magnetically a reed switch or the like mounted on a non-rotatable part of the vehicle such as, for example, a brake mounting plate. As the wheel rotates, the magnetic pulses supplied from the permanent magnet to the receiver mounted on the brake plate or the like are effective, in a control circuit, to light a warning lamp adjacent the driver's seat. A reset device, for rotating the shaft back to its original position, is mounted on the wheel rim and has an externally accessible operating end.

8 Claims, 6 Drawing Figures

FIG. 3
FIG. 4
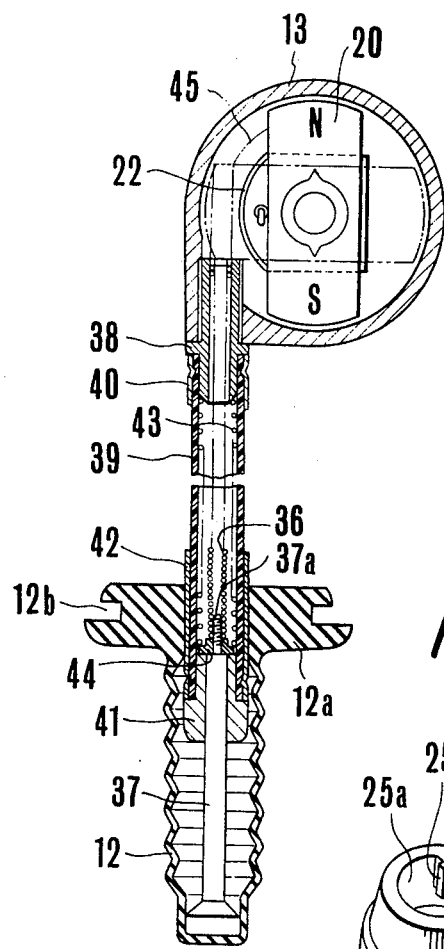
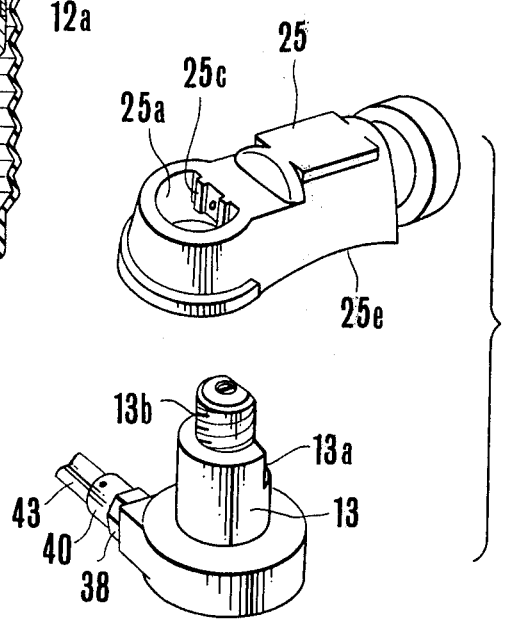

TIRE PRESSURE ALARM EQUIPMENT

FIELD AND BACKGROUND OF THE INVENTION

The present invention relates to an improved tire pressure alarm equipment for vehicles.

Hitherto many proposals have been made for such an equipment for indicating the tire pressure decrease to the driver's seat. However, known proposal had disadvantages such as high price, complexity, vulnerability. It is not too much to say that no one has been developed up to practical use. Such inability to provide a practical tire pressure alarm equipment has been due to the difficulty in transmitting an alarm signal from a transmitter mounted on the rotating tire to a receiver mounted on the axle or chassis of the vehicle, and this difficulty is present even when a tire pressure detector is mounted on the wheel rim or the tire to detect changes in the air pressure in the tire while the latter is rotating.

There is a type of a tire pressure alarm equipment which has the possibility of practical utility in which a magnet, rotatable in correspondence to the tire pressure is mounted on the wheel, while a reed switch is mounted on the axle side, e.g. on the back plate of a brake drum, but even this type has many difficulties to be overcome for practicable use, such as mounting, adjustment, centrifugal force, wheel deformation, effect of moisture, change in ambient temperature.

SUMMARY OF THE INVENTION

The aim of this present invention is to provide a tire pressure alarm equipment of practical usefulness at relatively low production cost.

Another aim of the present invention is to provide a tire pressure alarm equipment suitable for mass production and excellent workability.

For an understanding of the principles of the invention, reference is made to the following description of a typical embodiment thereof as illustrated in the accompanying drawings.

BRIEF DESCRIPTION OF THE DRAWINGS

In the drawings:

FIG. 1 is a sectional view showing the mounted state of an embodiment of the present invention;

FIG. 2, a sectional view along line A — A of FIG. 1;

FIG. 3, a sectional view along line B — B of FIG. 1;

FIG. 4, a perspective view of an important part;

FIG. 5, an important sectional view along line C — C of FIG. 2; and

FIG. 6, a circuit diagram of the alarm circuit.

DESCRIPTION OF THE PREFERRED EMBODIMENT

In FIG. 1, a tubeless tire 1 is mounted in a wheel rim 2 and a transmitter 4, belonging to the tire pressure alarm equipment, is mounted through a hole 3 provided in the wheel rim, while a receiver 7 is mounted on the back plate 6 of a brake drum 5 and connected via wire 8 to a circuit 9 provided at the driver's seat. Means for indication, e.g. lamp 10 or a buzzer, is energized via the circuit 9. 11 denotes a wheel disk welded onto the wheel rim, and a reset rod, which will be described still later, projects through one of the many ventilating holes 11*a* toward the outside of the wheel, and the base portion 12*a* of a tight cover, such as a bellows 12 covering the projection, is inserted into a ventilating hole 11*a*.

The construction of the transmitter 4 is explained be reference to FIG. 2. 13 denotes a first housing consisting of an aluminium forging in the form of cylinder with inner and outer diameters changing stepwise, and provided with a flat surface 13*a* on one side near its upper or outer end. A shaft 14, made of quenched stainless steel, is rotatably mounted in housing 13 and has conical recesses in each end engaging ball bearings 16 and 18, ball bearings 16 being located at the upper end of shaft 14, as viewed in FIG. 2, and ball bearing 18 being located at the lower end of shaft 14. The conical recesses are finished by grinding, so that friction is minimized. Due to the provision of the ball bearings 16 and 18, shaft 14 is rotatable even when subjected to centrifugal force due to rotation of the tire 1.

An aluminum plate 17 closes the lower or inner end of housing 13, and has pressed thereinto a seat 19, of quenched stainless steel, formed with a conical recess for receiving the ball 18. This inner or lower end of shaft 14 has secured thereto a permanent magnet which is relatively elongated, as shown in FIG. 3, having N and S poles at its opposite ends. Shaft 14 is inserted into a bore in a bush 21 cast in the central portion of magnet 20, and the parts are retained against displacement by a clamp 22, of quenched stainless steel, formed with a flat wall on one end and a bent wall on the other end.

23 denotes a spring made of stainless steel for applying a biasing torque to shaft 14, with one end engaging with the first housing 13 and with the other end engaging with clamp 22.

Hence, inside the first housing 13 there is the rotatable shaft 14 enclosed in a state supported by means of balls 16 and 18 both in the axial thrust and the radial directions. The end play of rotating shaft 14 is adjustable by means of a screw 15, and the head of screw is locked relative to the housing 13 with epoxy resin 24, after adjustment.

A second housing, made of an aluminum die casting, is indicated at 25 as formed with a transverse bore 25*a*, shown in FIG. 4, in one end for embraceably engaging the end of housing 13. Housing 25 is further formed with a longitudinally extending bore 25*b*, whose axis is perpendicular to the axis of transverse bore 25*a*, and which is formed with a female screw thread. Housing 25, constituted by a die casting, is surface treated with epoxy resin or copper, etc., after machining, in order to eliminate pin holes formed during the die casting operation. A metal guide sleeve 26 is pressed into housing 25, as shown in FIG. 2, for smooth guiding of a plunger, described hereinafter, in a small diameter bore 26*a* in the end surface of guide member 26.

27 denotes a plunger housing made of aluminium with male screw threads 27*a* on its outer surface for engaging with the female screw threads 25*b* of the second housing 25 and with a sleeve 28 made of low friction material, e.g. phenolic resin, engaging its inner surface. 29 denotes a plunger consisting of a rod 30 made of quenched stainless steel and a slider 31 made of phenolic resin and formed integral with the rod.

The outer surface of slider 31 is formed with a convex cross-section annular shoulder or rim 31*a* for minimizing friction between the slider and the sleeve. The left or inner end 31*b* of slider 31 acts as a stop engageable with the bottom surface 27*b* of the plunger housing, when the plunger travels to the left. This prevents the front or inner end of the plunger from exerting excessive side pressure on rotatable shaft 14 and, at the same time, prevents spring 34 from receiving excess stress above its permissible stress. 32 denotes a rubber diaphragm reinforced with cloth, with a flange 32a formed on the periphery. 33 denotes a holding plate with a ring-shaped ridge 33a and a plurality of ventilation holes 33b for providing for the tire air pressure to be exerted against diaphragm 32. Diaphragm 32 is tightly mounted, in sealing relation, by the end of plunger housing 27 being bent over against that side of the holding plate exposed to the tire air pressure, the holding plate bearing against the flange 32a on diaphragm 32. However, the tire air pressure is effective on diaphragm 32 to transfer the tire air pressure to plunger 30.

Stainless steel spring 34 is inserted between the bottom surface 27b of the plunger housing 27 and the port 31a of slider 31 of the plunger, and biases plunger 29 to the right against the tire pressure.

Figure 5:
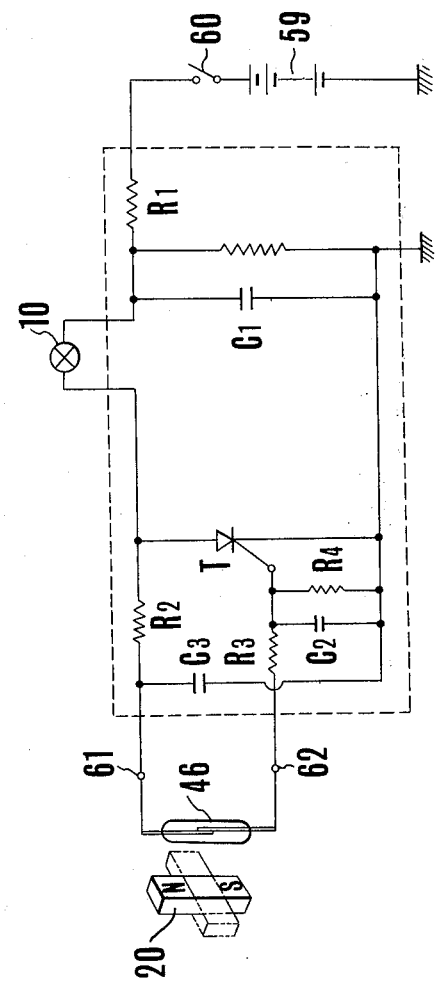

The end 30a of rod 30 projects out of the second housing 25, when the tire pressure is at the prescribed value or over, and, as shown in FIG. 5, engages a cutout notch 14a formed at one end of the shaft 14 in the first housing, thus preventing shaft 14 from rotating clockwise, as viewed in FIG. 5. The surface of the cutout engaging rod 30 is ground for minimizing friction.

35 denotes a cap nut, which serves for fixing the first and the second housings air-tight via an O-ring, by screwing onto threaded part 13b at the head of the first housing 13 after assembling the first and the second housings 13 and 25.

On the lower end of the first housing 13 there is mounted a resetting device for the transmitter, as shown in FIG. 3. 36 denotes a closely wound coil spring, with its fore end near the rotation zone of magnet 20 in the first housing 13 and on its rear end fixed to a reset rod 37. 38 denotes a sleeve, screwed in a tangential direction into the first housing and made of stainless steel or plated brass. Its inner surface serves for guiding coil spring 36 and a part of its periphery fits within a tube 39 made of plastics excellent in strength and weather-resistance, e.g. Nylon 11 (trade name). Tube 39 is fixed by a clamping sleeve 40 of stainless steel.

Reset rod 37 is guided in a bush 41, of stainless steel or plated brass, having a reduced diameter inner end telescoped into tube or sleeve 39 which is clamped in position by a clamp 42.

43 denotes a return spring for reset the rod, with one end in contact with the end surface of the sleeve 38 and with its other end in contact with a seat 44 fixed on the inner end of the reset rod 37. Seat 44 is at first threaded into a threaded extension 37a of the reset rod 37 with play, and then is fixed onto the reset rod by screwing the coil spring 36 onto the threaded part 37a.

12 denotes a bellows made of rubber with excellent weather-resistance and formed on its base portion 12a with a groove 12b engaging with the periphery of a ventilating hole of wheel disk 11 as mentioned above.

Accordingly, if the reset rod 37 is pressed in by a finger, the bellows 12 contracts, allowing the advance of the reset rod 37, and the coil spring 36 mounted on the inner end of the reset rod enters into the first housing 13 in a tangential direction, its inner end being capable, as shown by the double-dot-and-dash line in FIG. 3, of bending along the inner surface of the housing 13 and the clamp 22 and rotating magnet 20 rotate. If the finger is withdrawn, the coil spring 36 and the reset rod 37 can return to the original position by the action of the return spring 43.

Now the function of said transmitter will be explained. When tire pressure is at the prescribed value or over, the plunger 29 is, under the action of the diaphragm 32, biased to the left as viewed in FIG. 2 and its inner end 30a engages cutout 14a of shaft 14 and restrains the shaft against rotation by spring 23. In this stage, the magnet 20 lies perpendicular to a reed switch 46, described later, and the latter is not subjected to an effective magnetic flux. Further, the spring 23 is in the wound-up state and biases shaft 14 and the magnet in the direction of the arrow in FIG. 2.

If, during driving, the tire pressure decreases below the prescribed value due to some reason, the force, pushing the diaphragm 32 to the left, is weakened. Plunger 29 travels, being pushed by the spring 34, to the right, and its inner end 30a disengages cutout 14a of shaft 14 which rotates, together with the magnet 20 under the action of the spring 23 in the direction of arrow and, after a rotation of 90°, comes to stand still with magnet 20 in contact with the sleeve 38, bringing the magnet 20 parallel to the reed switch (shown in double-dot-and-dash line in FIG. 2) so that the magnetic flux acts on the reed switch 46 effectively and the latter closes intermittently with the rotation of the tire, thus sending alarm signal to the circuit, described later.

For resetting the equipment after restoring the tire pressure, the magnet 20, moved to the position shown in double-dot-and-dash line in FIG. 3, is pushed by the coil spring 36, when the reset rod 37 is pressed by a finger, and rotates by 90°, charging the spring 23 (FIG. 2) so that the cutout 14a of shaft 14 comes again in engagement with the plunger inner end 30a, now protruding due to restoration of the tire pressure. Thus the procedure is finished.

The adjustment of the working pressure of the transmitter is effected by turning the plunger housing 27 threaded into the second housing 25. With diaphragm 32 subjected to the prescribed air pressure, the plunger housing 27 is turned so that engagement between the plunger inner end 30a and the cutout 14a of shaft 14 is released, at which time the plunger housing 27 and the second housing 25 are locked with adhesive such as epoxy resin etc., so the transmitter is set at the prescribed working pressure. 48 denotes O-ring, inserted between the plunger housing 27 and the second housing 25 for sealing purpose.

When the transmitter, thus adjusted is mounted onto the wheel ring 2, the first housing 13 is inserted into the hole 3 from the inner side of the wheel rim 2 and the second housing 25 is inserted into the first housing from the outer side of the wheel rim 2. Thus it must be separated again into the first and second housings. In order to prevent the adjustment, made beforehand, from being lost, the construction should be such that the relative position of the first and second housings 13, 25 remains unchanged when both are connected together. However, because the periphery of the first housing 13 is made of an aluminum forging, as above mentioned, and its fitting surface is machined, because of necessary accuracy, there is no problem, the second housing 25, being made of an aluminum die casting and having the transverse bore 25a for fitting with the first housing 13, which bore has taper remaining from forming work and is shaped in a half circle, making machining work quite difficult, there is the possibility of the fitting of the first and second housings becoming inaccurate and of the working pressure becoming wrong. In the present invention, as shown in FIGS. 4 and 5, two ribs 25c are formed in the direction of withdrawing on the inner surface of bore 25a of the second housing 25 for contact with the flat surface 13a of the first housing. By putting the surface of ribs 25c and the flat surface 13a of the first housing into contact with each other, the fitting accuracy between the first and second housings 13, 25 is warranted.

By adopting such a construction, it is possible to form the surface of ribs 25c of the second housing 25 almost without the necessity of tapering in casting, since the area of this surface is very small.

Figure 2:
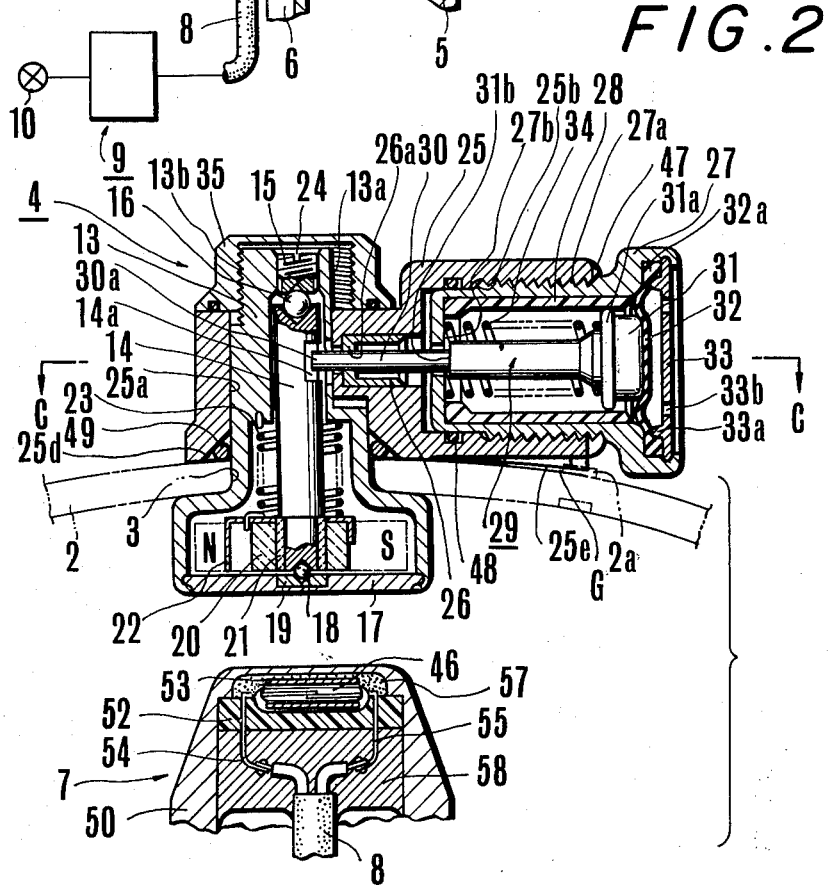

At the mounting of the transmitter into the wheel, the first housing 13, as shown in FIG. 2, is inserted into the hole 3 from the inner side of the wheel rim 2 and the second housing 25 is fitted to the first housing from the outer side (i.e. tire side) and both are clamped and fixed by the cap nut 35 via the O-ring. The bevelled surface 25d formed at 45° on the lower surface of the second housing 25 forms a ring-formed space with a triangular section or similar section and lets the O-ring 49, put in this space, contact securely in three ways with the wheel rim 2, the first housing 13 and the second housing 25, so that leakage of air from the tire and penetration of water or moisture into both housings are prevented perfectly.

In the mounted condition, there is some clearance G formed between the lower surface of the second housing 25 and the rim 2 (FIG. 2). This clearance G is provided so that excessive stress does not appear in the transmitter 4 when the vehicle is driven under severe conditions and the rim is deformed elastically. Also it serves for supporting load in that the lower surface 25e of the second housing comes in contact with the wheel rim 2 when the tire punctures and the transmitter 4 is impacted, and the radius of the lower surface 25e is preferably made larger by about 10 mm than that of the rim 2. Further, as shown in FIG. 1, by providing a clearance also between the shoulder 13c of the first housing and the peripheral portion of the wheel rim, stress in the transmitter 4 is avoided even when the wheel rim is deformed by sharp cornering of the vehicle.

Further 2a denotes a protrusion formed out of the wheel rim 2, which engages with a part of the second housing 25 and serves as a stopper against rotation of the transmitter 4 in the mounted state.

Diaphragm 32 mounted on the transmitter separates interior and exterior of the transmitter absolutely, so that the pressure in the transmitter fluctuates according to variation in tire pressure or fluctuation of ambient temperature and causes variation in the working pressure of the transmitter, which is objectionable.

In order to avcid this defect, it suffices to lay the inside of the transmitter open to atmosphere. However, the aspirating action due to connection to atmosphere makes it possible for moisture and dust to enter the transmitter, and reduced durability and reliability of the equipment may be expected.

In the present invention, the first and second housings 13, 25 are tightly interconnected and the interior of the housings are connected via the tube 39 of FIG. 3 and the clearance between periphery of the reset rod 37 and the interior of the bellows 12, which is, at its base portion 12a, tightly sealed by the clamping sleeve 42. Hence it is possible to have the inner pressure of the first and second housings 13, 25 kept constant by expansion and contraction of the easily deformable bellows 12 without intrusion of moisture, dust, etc. and to maintain the working pressure constant.

Now the construction of the receiver 7 will be explained by reference to FIG. 2. 50 denotes a casing made of an aluminum die casting, to be fixed by means of a bolt 51 (FIG. 1) onto the back plate of the brake drum or baffle plate of the disk brake. 46 denotes a magnetic flux responsive element, e.g. a generator coil, a magnetic diode Hall generator, a reed switch. In this embodiment, the explanation will be based on a reed switch. The reed switch 46 is mounted on an insulating plate 52, made of phenolic resin, etc., in a manner such that the glass tube part does not come in contact with plate 52, and onto the glass tube there is fitted a sleeve 53 made of soft insulating material such as poly vinyl chloride, thus protecting the reed switch 46 from breakage.

The reed switch 46 mounted on the insulating plate 52 is inserted into said casing 50 and the space around the reed switch is completely filled with insulating buffer e.g. silicone rubber 57. So air can be completely expelled from space around the reed switch 46 which can remain without degradation of insulation even when it is exposed to high temperature.

Onto the two lead wires 54, 55 on opposite ends of the reed switch 46 there are soldered the wires 8 connecting to the circuit, the space around which is filled with hardening insulation material, e.g. epoxy resin 58, for the purpose of protecting the soldered parts from outside force imposed on the wire 8 and also of preventing moisture from intruding into the reed switch 46 or inside of the wire. Further the wire is fixed by means of a bracket 56 which is secured to the casing 50 by the bolt 51.

Figure 6:
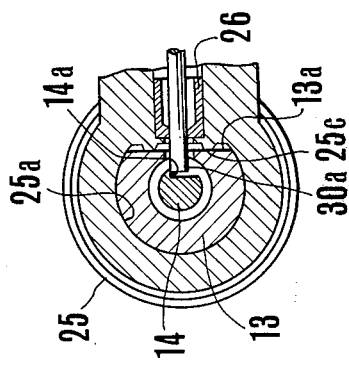

Now the circuit will be explained by reference to FIG. 6. 59 denotes electric source, 60, an ignition switch of constituting the vehicle and 10, an alarm lamp, the load. Resistance $R_1$ and condenser $C_1$ are inserted for the purpose of suppressing surge voltages arising in an electric source circuit. T denotes a thyristor connected in series with the lamp 10, and the reed switch 46 is connected in parallel with the gate and anode of the thyristor. Resistance $R_3$ and condenser $C_2$ form an integrating circuit connected to the gate so that the gate not function erroneously under high frequency noise. Resistance $R_4$ is to set the voltage of the gate in order for the thyristor T to function erroneously. Condenser $C_3$ is charged via lamp 10 and the charged energy of the condenser $C_3$ is discharged through the reed switch 46 and the gate of the thyristor T when the reed switch 46 is closed, thus supplementing the turning-on of the thyristor T. Resistance $R_2$ prevents the condenser $C_3$ from discharging onto the anode side of the thyristor.

Now the function of the circuit will be explained. With the ignition switch 60 in closed state, the magnet 20 of the transmitter lies in a position perpendicular to the reed switch 46, as shown in double-dot-and-dash line in FIG. 6, when the tire pressure is higher than the prescribed value, and the reed switch 46 is not closed. Hence the thyristor T also does not turn-on and the lamp 10 is not lit.

When the tire pressure decreases below the prescribed value, the magnet 20 of the transmitter turns 90° and becomes parallel with the reed switch 46. The thus re-oriented magnet 20 passes by the reed switch periodically with the rotation of the tire so that the reed switch 46 is closed intermittently and the gate current flows through the gate of the thyristor T which causes condition between the anode and cathode of the thyristor T and lighting of the lamp 10. Once the thyristor T is turned-on, it remains conductive even when the gate current dies out, and the lamp remains burning continuously, indicating the decrease in the tire pressure to the driver.

In the present invention, as the reed switch circuit including the resistances $R_2$ and $R_3$ is connected in parallel between the anode and the gate of the thyristor, the potential difference between opposite ends of the reed switch is diminished to almost nil due to conductance between the anode and cathode of the thyristor. So almost no current flows thereafter through the reed switch, which remains practically without any wear and its durability can be improved remarkably.

Further it was possible that, during driving of the vehicle, the transmitter was hit by a pebble or the like, with the reed switch becoming closed by the shock, thus turning-on the thyristor and lighting the lamp without any change in tire pressure so that the driver was given a false alarm. In the present invention, such erroneous action can be avoided by selecting characteristics of the integrating circuit with the condenser $C_2$ and the resistance $R_3$ so that the potential of the gate circuit of the thyristor will not increase sufficiently to effect turning-on of the thyristor unless the reed switch is actuated ON-OFF at a certain cycle or more particularly a cycle approximate to tire revolution at low speed driving. If necessary, in place of the integrating circuit, a counting circuit can be inserted, which circuit produces a gate voltage due to ON-OFF signals from a plurality of reed switches.

Further the circuit is reset when the driver brings the vehicle to standstill and puts off the ignition switch 60.

In the present embodiment, the invention is explained with reference to one wheel. For a plurality of wheels, the lamp 10 can give an alarm on the change in pressure for any of the wheels by providing every wheel with the transmitter and the receiver and connecting the reed switches to the terminals 61, 62 in FIG. 6. If one wishes to know by means of the lamp which tire is out of order, as many circuits as the number of tires can be provided and, for each circuit, one reed switch and one lamp can be arranged.

The construction of the present invention is as above mentioned and makes it possible to offer an inexpensive tire pressure alarm equipment which is easy to manufacture and adjust, easily mounted onto a wheel, resistant to both centrifugal force due to wheel rotation and external force from severe operation, amply waterproof and unaffected by change in temperature and which can exhibit a stable function for longer period, by improving a tire pressure alarm equipment hitherto difficult to make practicable. Thus it contributes greatly to traffic safety.

In the illustrated embodiment, explanation is based on a transmitter with a rotating magnet. However, it is obvious that the present invention includes also, within its scope, a type of transmitter in which a member, made of non-permanent magnetic material and capable of shunting the magnetic flux of a magnet fixed in the housing, is fixed onto a rotatable shaft so that by rotation of the member, a magnetic responding element such as a reed switch, etc. can be actuated.

What is claimed is:

1. Tire pressure alarm apparatus comprising, in combination, a first housing mounted on a wheel rim, rotatably mounted on a vehicle and supporting a tubeless tire, so as to extend at least partially into the air space defined by said rim and said tire; a plunger housing operatively associated with said first housing, a plunger mounted for reciprocation in said plunger housing in a direction substantially perpendicular to a radial plane of said tire, and movable in accordance with the air pressure in said tire; a shaft arranged inside said first housing to extend substantially parallel to said radial plane; anti-friction thrust ball bearing means supporting said shaft at its one end for smooth rotation of said shaft even when subjected to centrifugal force in its axial direction due to rotation of said rim and tire; detent means on said shaft and said plunger interengageable when said plunger is subjected to a tire air pressure having at least a preselected value to maintain said shaft in a first angular position; said plunger moving, to disengage said detent means, when the tire air pressure decreases below said preselected value; means adjustably mounting said plunger housing in said first housing for setting the working pressure to a predetermined value; means biasing said shaft to a second angular position upon disengagement of said detent means; an elongated magnetic member fixed on an end of said shaft to extend diametrically thereof and producing a change in magnetic flux in the space outside said rim during rotation of said rim and tire with said shaft and magnet in said second angular position; a magnetic flux responsive element mounted on a non-rotatable portion of the vehicle at a position wherein it is subject to such change in magnetic flux and operable to produce an output signal responsive to such change; and alarm signal means connected to said element and providing an alarm signal responsive to such output signal.

2. Tire pressure alarm apparatus, as claimed in claim 1, including a diaphragm subjected to the tire pressure and engaged with said plunger; a spring biasing said plunger into engagement with said diaphragm; said plunger housing mounting said plunger, said spring and said diaphragm; said plunger housing and said first housing being threadedly interconnected whereby adjustment of the working pressure can be effected by screwing said plunger housing into and out of said first housing in the direction of plunger reciprocation.

3. Tire pressure alarm apparatus comprising, in combination, a first housing insertable through an opening in a wheel rim, rotatably mounted on a vehicle and supporting a tubeless tire, so as to extend at least partially into the air space defined by said rim and said tire; a magnetic member mounted within said first housing and operable to produce a change in magnetic flux in the space outside said rim; a second housing formed with a bore arranged to have inserted therethrough that portion of said first housing extending into the air space for connection of said second housing to said first housing; said bore being formed with a conical portion at its end facing said wheel rim; and an annular elastic sealing member inserted into the triangular cross-section annular clearance space defined by said conical portion, the peripheral surface of said first housing, and said wheel rim for tight contact with the surfaces of said annular clearance space to prevent leakage of air from said tire and penetration of water into said first and second housing through the clearance between said wheel rim opening and the peripheral surface of said first housing.

4. Tire pressure alarm apparatus comprising, in combination, a first housing insertable through an opening in a wheel rim, rotatably mounted on a vehicle and supporting a tubeless tire, so as to extend at least partially into the air space defined by said rim and said tire; a magnetic member mounted within said first housing and operable to produce a change in magnetic flux in the space outside said rim; a second housing formed with a bore arranged to have inserted therethrough that portion of said first housing extending into the air space for connection of said second housing to said first housing; said second housing being formed of a light alloy and extending circumferentially of said wheel rim; a plunger mounted for reciprocation in said second housing and movable in accordance with the air pressure in said tire; the exterior surface of said second housing extending along and facing said wheel rim being formed with a support portion contactable with said wheel rim to support a load imposed on said second housing when the tire is punctured by contacting the wheel rim; said support portion having a predetermined clearance with respect to said wheel rim for enabling elastic deformation of said wheel rim during the vehicle driving and enabling said support portion to contact with said wheel rim when the tire is punctured.

5. Tire pressure alarm apparatus comprising, in combination, a first housing insertable through an opening in a wheel rim, rotatably mounted on a vehicle and supporting a tubeless tire, so as to extend at least partially into the air space defined by said rim and said tire; a magnetic member mounted within said first housing and operable to produce a change in magnetic flux in the space outside said rim; a second housing formed with a bore arranged to have inserted therethrough that portion of said first housing extending into the air space for connection of said second housing to said first housing; said bore in said second housing being formed with a flat planar portion extending axially thereof; plural ribs extending from said flat planar portion parallel to the axis of said bore; the external peripheral surface of said first housing being formed with a flat planar surface engageable with said ribs to set the relative angular position of said first and second housings.

6. Tire pressure alarm apparatus comprising, in combination, a housing inserted through an opening in a wheel rim, rotatably mounted on a vehicle and supporting a tubeless tire, from the inner side of said wheeled rim; a magnetic member mounted in said housing for angular displacement between first and second angular positions; said magnetic member producing a change in magnetic flux in the space outside said wheel rim, during rotation of said wheel rim and said tire, when said magnetic member is in said angular position; said wheel rim including a wheel disc; a reset rod extending from said housing through a ventilating aperture in said wheel disc to the exterior of said wheel disc and operatively associated with said magnetic member so that, when said reset rod is manually actuated, said magnetic member is restored to said first angular position; a guide member surrounding said reset rod in an elastic water-tight covering while providing for relative displacement of said reset rod and said guide member; said cover enclosing said guide member and said reset rod; and a base part formed integrally with said cover for water-tightly supporting said guide member; said base part having an engaging portion engaging said ventilating aperture for supporting said cover and said guide member.

7. Tire pressure alarm apparatus, as claimed in claim 6, in which the interior of said cover, sealed off from the ambient atmosphere, communicates with the interior of said housing so that a change in pressure in the interior of said housing, due to a change in temperature therein, can be compensated by a change in volume within said tightly sealed cover.

8. Tire pressure alarm apparatus, as claimed in claim 1, in which said one end of said shaft is formed with a conical recess engaging said thrust ball bearing means.

* * * * *